United States Patent [19]
Huang

[11] Patent Number: 5,529,327
[45] Date of Patent: Jun. 25, 1996

[54] SHOCK ABSORBING DEVICE FOR A BICYCLE

[75] Inventor: Chung-hsin Huang, Taichung Hsien, Taiwan

[73] Assignee: Aprebic Industry Co., Ltd., Taiwan

[21] Appl. No.: 386,307

[22] Filed: Feb. 8, 1995

[51] Int. Cl.⁶ .................................................. B26A 25/08
[52] U.S. Cl. ........................................ 280/276; 267/141.1
[58] Field of Search .................................... 280/276, 277, 280/275, 283, 284, 285, 286; 267/141.1, 141, 141.3, 170

[56] References Cited

U.S. PATENT DOCUMENTS

| | | | |
|---|---|---|---|
| 5,193,833 | 3/1993 | Reisinger | 280/277 X |
| 5,310,203 | 5/1994 | Chen | 280/276 |
| 5,367,918 | 11/1994 | Chang et al. | 280/276 X |
| 5,441,291 | 8/1995 | Girvin, III | 280/276 |
| 5,460,357 | 10/1995 | Stewart | 280/276 |

*Primary Examiner*—Kevin T. Hurley
*Attorney, Agent, or Firm*—Hedman, Gibson & Costigan

[57] ABSTRACT

A shock absorbing device includes an upper cap, a plurality of absorbing blocks, a plurality of middle elements and a lower cap, each of the upper cap, the lower cap and the middle elements has a hole centrally defined therein for a shaft extending therethrough, the absorbing block disposed between the upper cap and the following middle element, every two adjacent middle elements and the middle element adjacent the lower cap and the lower cap, the upper cap, the lower cap and each of the middle elements having a skirt portion extending vertically from a respective periphery thereof, the adjacent skirt portions will abut each other because of the deformation of the absorbing block disposed therebetween wherein the deformation does not yet reach an elastic fatigue point of the absorbing block.

2 Claims, 4 Drawing Sheets

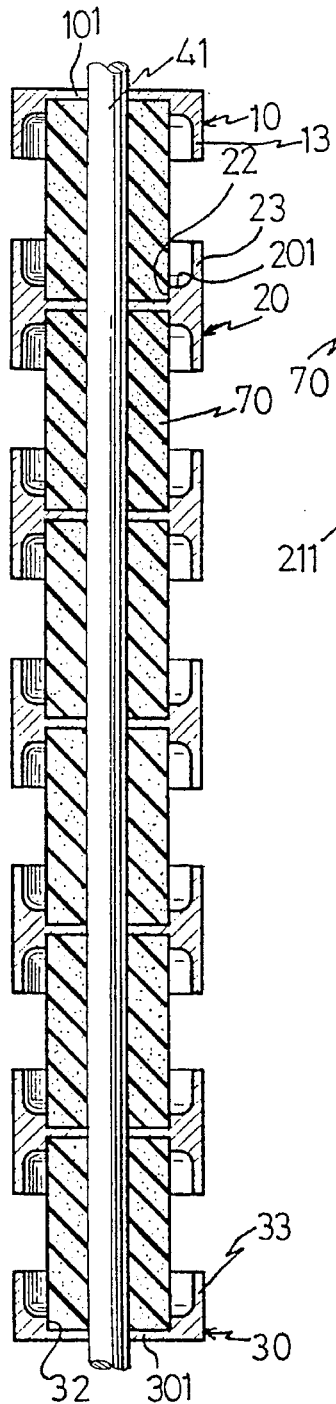
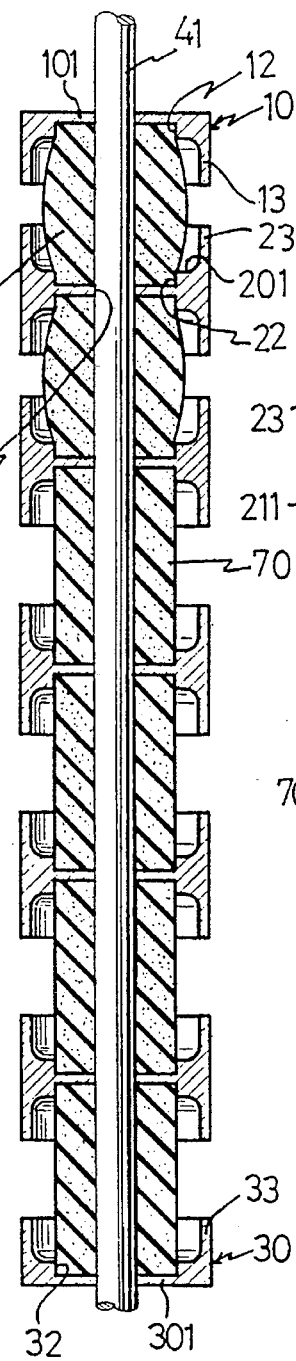
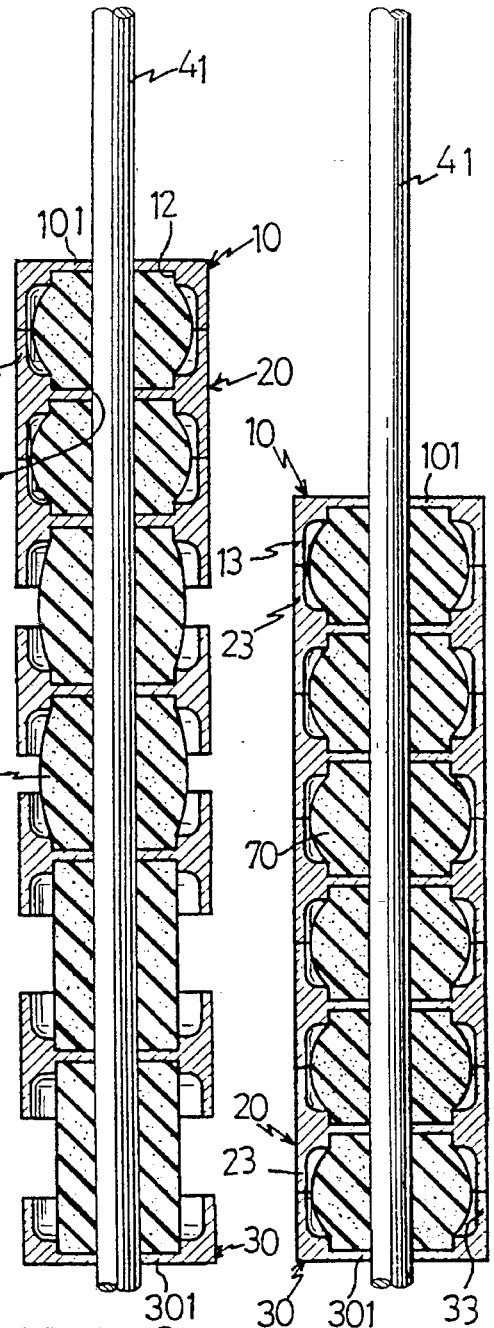
FIG. 7   FIG. 8   FIG. 9   FIG. 10

# SHOCK ABSORBING DEVICE FOR A BICYCLE

BACKGROUND OF THE INVENTION

The present invention relates to a shock absorbing device, and more particularly to a shock absorbing device for a bicycle.

There is a known a kind of shock absorbing device for a bicycle as shown in FIGS. 1 and 2, which is disposed in a front fork 80 for example, and includes a shaft 41 extending through six absorbing blocks 60 for example, and fixedly engaged within the front fork 80, an upper cap 50 having a hole defined therein for the shaft 41 to extend therethrough is engaged to an upper end of a first of the blocks 60 (the upper-most one) and a lower cap 52 having a hole defined therein for the shaft 41 to extend therethrough is engaged to a lower end of a sixth of the blocks 60 and a middle element 51 having a hole defined therein for the shaft 41 to extend therethrough is engaged between every two adjacent blocks 60 such that when the bicycle is ridden over a rugged road, the shock transferred from the rugged road is absorbed by deformations of the blocks 60.

Referring to FIG. 3, generally, the first two blocks 60, from up to down in the figures, are made of the most soft material, and third and the fourth blocks 60 are made of regular soft material and the fifth and the sixth blocks 60 are made of harder material, therefore, the first and the second blocks 60 are deformed no matter whether the shock is small or large. However, referring to FIG. 4, there are no limitations in the radial direction for the blocks 60 being deformed between the upper cap 50 and the middle elements 51, the two middle elements 51 and the middle element 51 and the lower cap 52, accordingly, the first and the second blocks 60 tend to absorb all the shocks until an elastic fatigue point thereof is reached such that the first and the second blocks 60 cannot be deformed anymore and will not return to their original configurations, that is, the shock will not be transferred to the third and the fourth blocks 60 unless the first and the second blocks 60 reach their elastic fatigue points of deformation, and this results in an early damages of the first and the second blocks 60. Similarly, referring to FIG. 5, the rest of the blocks 60 will be damaged by the same way.

The present invention provides a shock absorbing device which has an upper cap, a plurality of middle elements and a lower cap each of which has a skirt portion extending vertically so as to abut each other when the block disposed therebetween is deformed to avoid from reaching the elastic fatigue point of the block to mitigate and/or obviate the above-mentioned problems.

SUMMARY OF THE INVENTION

The present invention provides a shock absorbing device, which includes an upper cap, a plurality of absorbing blocks, a plurality of middle elements and a lower cap, the upper cap, the lower cap and each of the absorbing blocks and the middle elements have a hole centrally defined therein for a shaft extending therethrough, the absorbing block disposed between the upper cap and the following middle element, every two adjacent middle elements and the middle element abutting the lower cap and the lower cap, the upper cap, the lower cap and each of the middle elements having a skirt portion extending vertically from a respective periphery thereof, the adjacent skirt portions will abut each other because of the deformation of the absorbing block disposed therebetween wherein the deformation does not yet reach an elastic fatigue point of the absorbing block.

It is an object of the present invention to provide a shock absorbing device which has a feature of avoiding the block from reaching an elastic fatigue point thereof.

Other objects, advantages, and novel features of the invention will become more apparent from the following detailed description when taken in conjunction with the accompanying drawings.

BRIEF DESCRIPTION OF THE DRAWINGS

FIG. 7.is a side elevational view, partly in section, of the shock absorbing device in accordance with the present invention and in a normal status;

FIG. 8 is a side elevational view, partly in section, of the shock absorbing device in accordance with the present invention wherein the first and the second absorbing blocks are deformed;

FIG. 9 is a side elevational view, partly in section, of the shock absorbing device in accordance with the present invention wherein the first, the second, the third and the fourth absorbing blocks are deformed; and FIG. 10 is a side elevational view, partly in section, of the shock absorbing device in accordance with the present invention wherein all of the six absorbing blocks are deformed.

DETAILED DESCRIPTION OF THE PREFERRED EMBODIMENT

Figure 1:
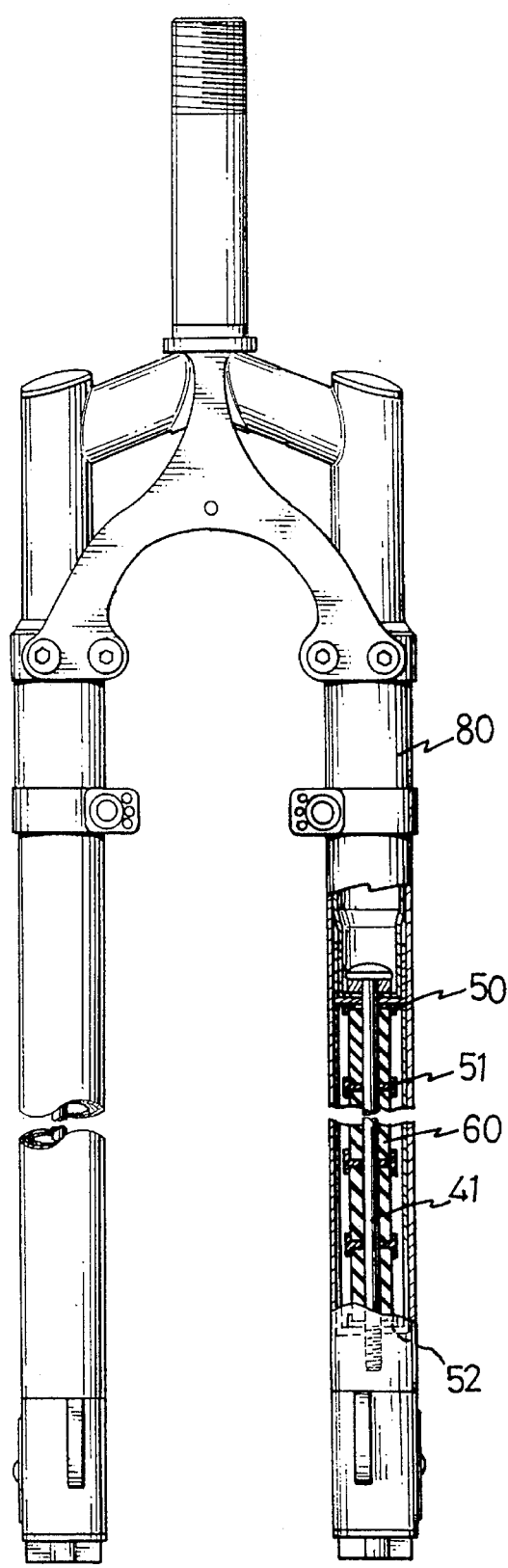
FIG. 1 is a front plane view, partly in section, of a front fork with a conventional shock absorbing device disposed therein.
Figures 2, 3, 4, 5:
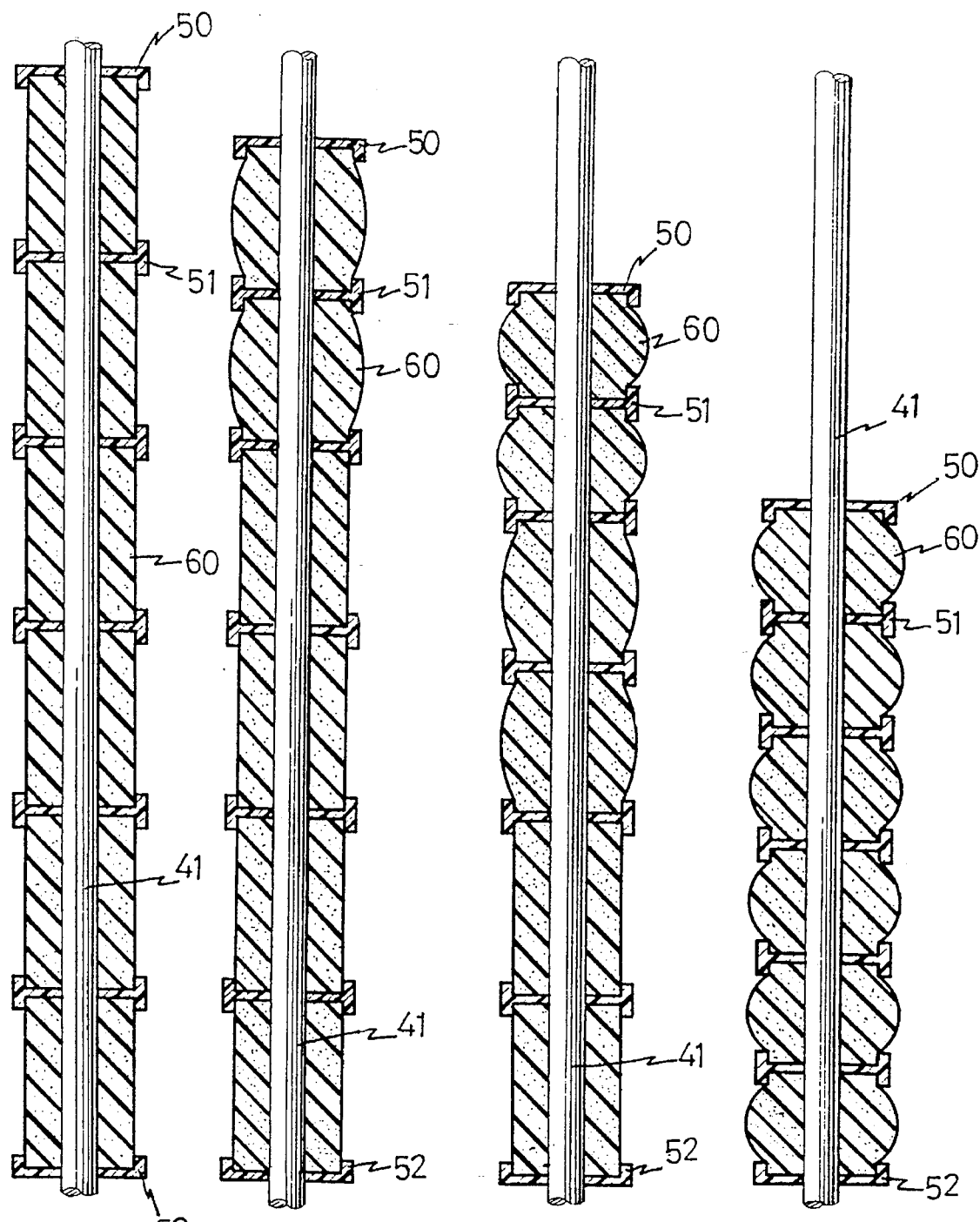
FIG. 2 is a side elevational view, partly in section, of the conventional shock absorbing device which is in a normal status.
FIG. 3 is a side elevational view, partly in section, of the conventional shock absorbing device wherein the first and the second absorbing blocks are deformed.
FIG. 4 is a side elevational view, partly in section, of the conventional shock absorbing device wherein the first, the second, the third and the fourth absorbing blocks are deformed.
FIG. 5 is a side elevational view, partly in section, of the conventional shock absorbing device wherein all of the six absorbing blocks are deformed.
Figure 6:
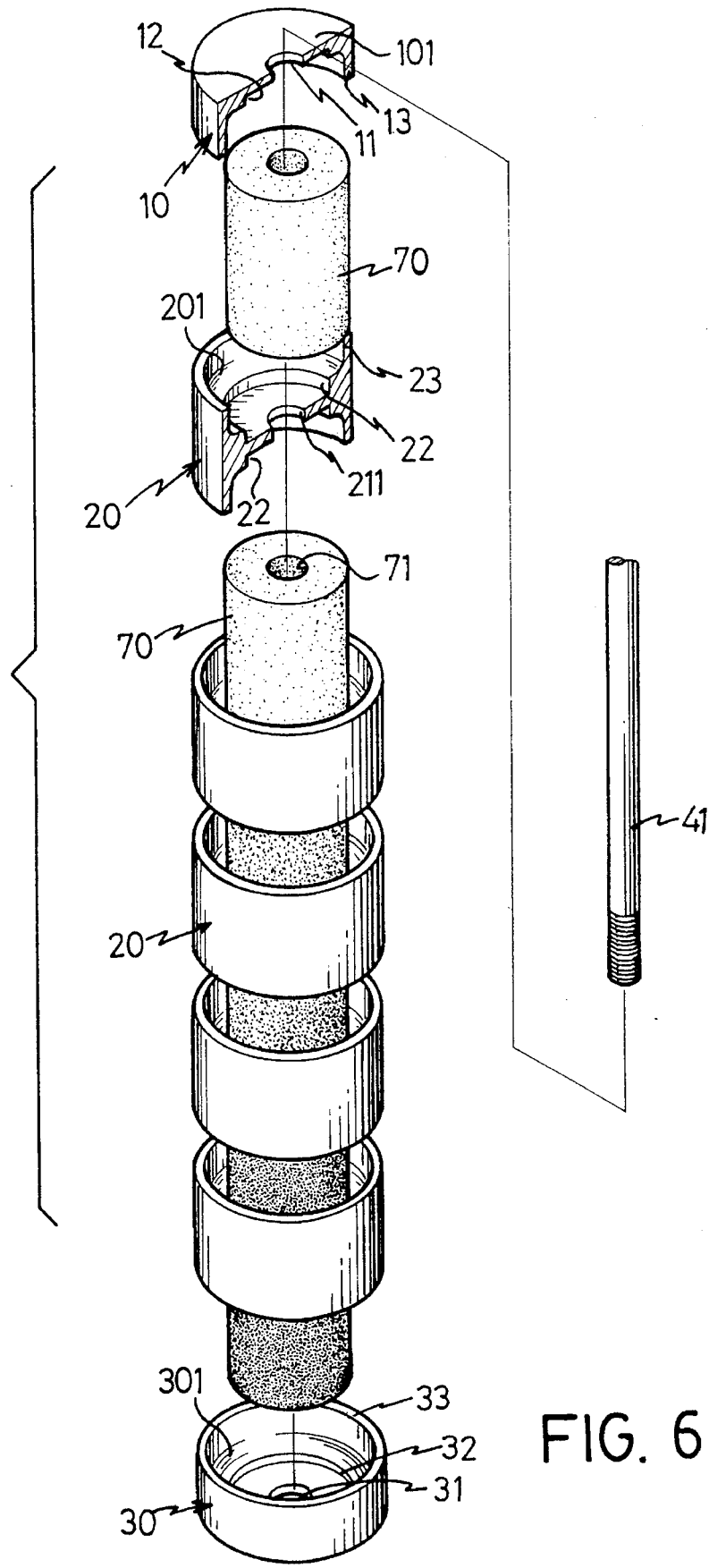
FIG. 6 is an exploded view of a shock absorbing device in accordance with the present invention.

Referring to the drawings and initially to FIGS. 6 and 7, the shock absorbing device in accordance with the present invention generally includes six blocks 70 for a description purpose, an upper cap 10, five middle elements 20 for a description purpose, a lower cap 30 and a shaft 41. Each of the blocks 70 has a hole 71 centrally defined therein, the first and second blocks 70, from up to down in the figures, are made of the softest material, the third and the fourth blocks 70 are made of regular soft material and the fifth and the sixth blocks 70 are made of harder material. The upper cap 10 has an inverted U-shaped cross section formed by a first plate 101 and a first skirt portion 13 extending downwardly from a periphery of the first plate 101, a first hole 11 centrally defined in the first plate 101 and a first recess 12 defined in a lower side of the first plate 101. The lower cap 30 has a U-shaped cross section formed by a second plate 301 and a second skirt portion 33 extending upwardly from a periphery of the second plate 301, a second hole 31 centrally defined in the second plate 301 and a second recess 32 defined in an upper side of the second plate 301.

The middle element 20 has a transverse I-shaped cross section formed by a third plate 201 and a double skirt portion 23 extending vertically from a periphery of the third plate 201, a third hole 211 centrally defined in the third plate 201 and a third recess 22 defined in an upper side and a lower side of the third plate 201 respectively. The shaft 41 is fixedly engaged to a frame of the bicycle, a front fork for example (figures not shown), at both ends thereof.

The block 70 is force-fitted between the first recess 12 of the upper cap 10 and the third recess 22 of the upper side of the third plate 201 of the middle element 20, the facing third recesses 22 of every two adjacent middle elements 20 and the third recess 22 of the middle element 20 and the second recess 32 facing thereto of the lower cap 30, the shaft 41 extends through the first hole 11 of the upper cap 10, the hole 71 of each of the blocks 70, the third hole 211 of each of the middle elements 20 and the second hole 31 of the lower cap 30.

Referring to FIG. 8, when a shock is absorbed by the device, the first and the second blocks 70 are deformed and the upper cap 10 and the first middle element 20 are therefore lowered along the shaft 41. Referring to FIG. 9, if the shock is so great that it makes the first and the second blocks 70 be deformed and result in a contact between a lower periphery of the first skirt portion 13 and an upper periphery of the double skirt portion 23 of the first middle element 20, therefore, the third and the fourth blocks 70 absorb the remaining force of the shock and the second middle element 20 is lowered along the shaft 41. The contact of the first skirt portion 13 of the upper cap 10 and the double skirt portion 23 of the first middle element 20 facing the upper cap 10 restrains the first block 70 from being deformed continually so as to avoid the first block 70 from reaching its elastic fatigue point. The second block 70 is protected by a contact of the respective double skirt portion 23 of the first and the second middle elements 20.

Also, referring to FIG. 10, the third to the sixth blocks 70 are protected to avoid from reaching their elastic fatigue points by the same way.

Accordingly, the elastic features of the blocks 70 of the present invention are prolonged under the arrangement of thee present invention.

Although the invention has been explained in relation to its preferred embodiment, it is to be understood that many other possible modifications and variations can be made without departing from the spirit and scope of the invention as hereinafter claimed.

I claim:

1. A shock absorbing device for a bicycle comprising:

a plurality of blocks, each of said blocks having a hole centrally defined therein;

an upper cap having an inverted U-shaped cross section formed by a first plate and a first skirt portion extending downwardly from a periphery of said first plate, a first hole centrally defined in said plate;

a lower cap having a U-shaped cross section formed by a second plate and a second skirt portion extending upwardly from a periphery of said second plate, a second hole centrally defined in said second plate;

a plurality of middle elements, each of said middle elements having a transverse I-shaped cross section formed by a third plate and a double skirt portion extending vertically from a periphery of said third plate, a third hole centrally defined in said third plate, said middle elements disposed between said upper cap and said lower cap, and a shaft fixedly engaged to a front fork of said bicycle at both ends thereof;

a plurality of blocks being disposed between said upper cap and said lower cap with a middle element being interposed between each of said blocks, said shaft extending through said first hole of said upper cap, said holes of said blocks, said third holes of said middle elements and said second hole of said lower cap, each said adjacent first, second and double skirt portions being adapted to abut each other when a predetermined deformation of each block occurs.

2. The shock absorbing device as claimed in claim 1 wherein said first plate has a first recess defined in a lower side thereof, said second plate has a second recess defined in an upper side thereof and each of said third plates has a third recess defined in an upper side and an under side thereof respectively, said first recess, said second recess and each of said third recesses having a diameter which allows one of said blocks to be force-fitted therein.

\* \* \* \* \*